United States Patent [19]

Deutsch

[11] Patent Number: 4,536,819
[45] Date of Patent: Aug. 20, 1985

[54] CAPACITOR WITH A HEAT SINK CORE

[75] Inventor: Emory Deutsch, Columbia, S.C.

[73] Assignee: North American Philips Corporation, New York, N.Y.

[21] Appl. No.: 456,949

[22] Filed: Jan. 10, 1983

[51] Int. Cl.³ .................. H01G 9/00; H01G 1/08; H01G 7/00
[52] U.S. Cl. .................................. 361/274; 361/433
[58] Field of Search ............... 361/274, 433, 275, 272, 361/282, 381, 386, 387; 174/15 R

[56] References Cited

U.S. PATENT DOCUMENTS 3,238,428 4/1959 Kellerman .......................... 361/274
3,670,210 6/1972 Blase ................................... 361/433

Primary Examiner—L. T. Hix
Assistant Examiner—Douglas S. Lee
Attorney, Agent, or Firm—Thomas A. Briody; William J. Streeter

[57] ABSTRACT

A capacitor construction for wound foil or electrolytic capacitors having a heat conducting inner can for improving the heat dissipation of the capacitor and for eliminating the need for pitch or epoxy to pot the capacitor roll in an outer can.

4 Claims, 11 Drawing Figures

CAPACITOR WITH A HEAT SINK CORE

This invention relates to an improved construction for a capacitor, and more particularly to a wound foil or electrolytic capacitor construction. The improved capacitor construction of the present invention provides improved heat dissipation for a capacitor and an economical construction adaptable to automated large-scale manufacturing.

In accordance with the invention there is provided a capacitor construction having a heat conducting inner can upon which the capacitor roll (anode, cathode, and dielectric) is wound. The inner can functions as a heat sink. In addition, the inner can is hollow and is provided at a first end with means for fastening it in good heat conducting relationship to the closed end of an outer can.

The outer can encases the assembly of inner can, anode, cathode, and dielectric. The open end of the outer can is closed by an insulating closure member that supports solder lugs or terminals that connect to the anode and cathode by means of tab leads. The closure member may be held in place by epoxy material or by crimping and rilling the open end of the outer can.

It will be seen that the resulting construction provides for dissipation of heat generated within the capacitor not only through the lateral surface of the outer can, but also by conduction axially along the inner can and though the closed end of the outer can. By mounting the closed end of the outer can in heat conducting relationship to an external heat sink, the heat dissipation of the capacitor may be further improved. Furthermore, the inner can and capacitor roll are held in position within the outer can, thereby eliminating the need for potting material to perform that function.

Other features and advantages of the present invention will be apparent to those skilled in the art from the following description and appended claims when considered in conjuction with the accompanying drawing, in which:

Figure 1:
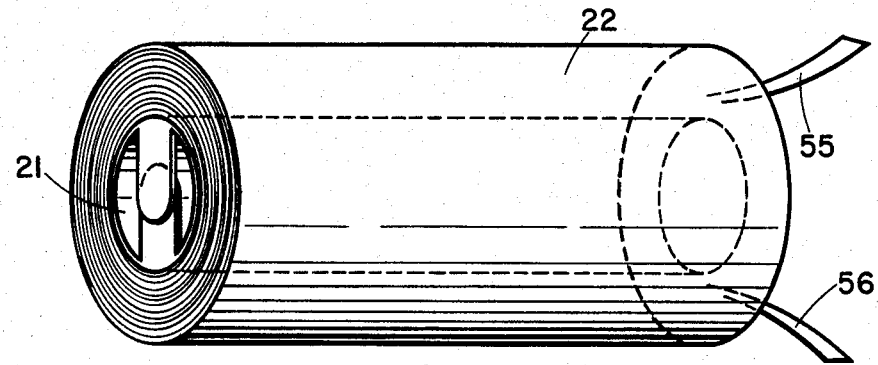
FIG. 1 is a drawing of a capacitor assembly having an inner can, anode, cathod and dielectric.

As shown in FIG. 1, the construction of the present invention has an inner can 21 which may be cylindrical in shape and provide a form upon which foil and dielectric film may be wound to form a capacitor roll comprising an anode, cathode, and separating dielectric, shown generally a 22. The inner can 21, unlike a retractable arbor commonly used to wind a capacitor roll, remains with the roll and becomes a permanent part of the capacitor. Although the inner can 21 of FIG. 1 is illustrated to be cylindrical, it may have other cross-sectional shapes, e.g. square or rectangular, for special applications.

Figure 2:
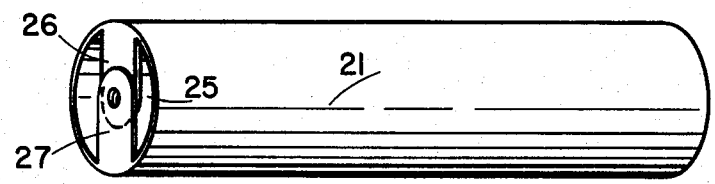
FIG. 2 is a drawing of one embodiment of an inner can for a capacitor made in accordance with the present invention.
Figure 3:
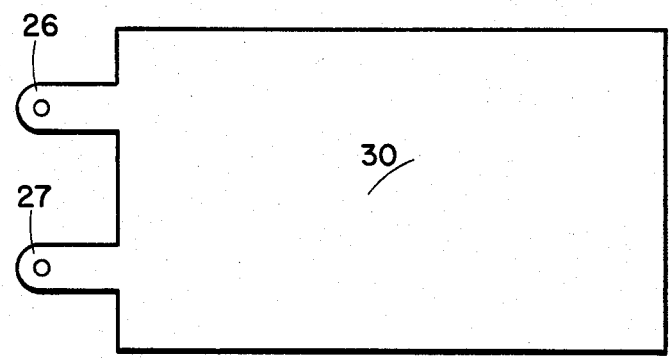
FIG. 3 is a blank for forming the inner can of FIG. 2.

FIG. 2 shows one embodiment of inner can 21 having a cylindrical cross-section and an end portion 25. The end portion 25 may be formed of tabs 26 and 27. FIG. 3 shows a blank stamping 30 from which the inner can 21 of FIG. 2 may be formed.

Alternatively, inner can 21 may be formed by other methods, such as casting, explosive forming, extrusion die forming or deep drawing. Aluminum is believed to be the best material for the inner can because of its availability, low cost, and ease of workability, combined with good thermal conductivity.

Figure 4:
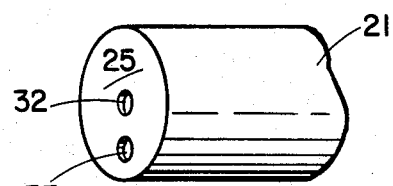
FIG. 4 is a partial view of another embodiment of an inner can suitable for use in the present invention.

FIG. 4 shows an inner can construction formed by extrusion die forming or deep drawing. The end portion 25 is fully closed and has a center hole 32 which may be used to fasten the inner can 21 to an outer can as will be described below. The end portion 25 may also be provided with a radially located hole 33 for receiving a driving dog or stud to rotate the inner can during winding of the capacitor roll.

Figure 5A:
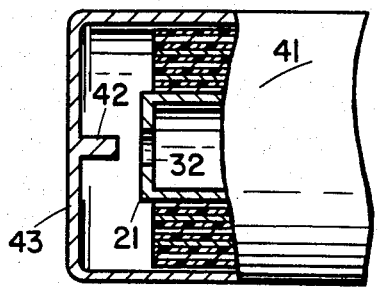
FIG. 5A is a sectional view showing how the assembly of FIG. 1 is received within an outer can and a first fastening means therefor.
Figure 5B:
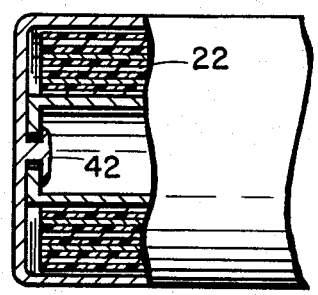
FIG. 5B is a sectional view of the embodiment of FIG. 5A showing the parts in final assembled relationship.

A number of embodiments or variations may be implemented for fastening the inner can to the outer can. Some of these are shown in FIGS. 5-7. FIG. 5A shows an embodiment wherein an outer can 41 is provided with a stud or stub 42 on the inner surface of a closed end 43. The stub 42 is received within hole 32 of the inner can, and in final assembled relationship is staked or peened into a deformed shape, such as illustrated in FIG. 5B, to hold the inner and outer can together in good heat conducting relationship.

Figure 6A:
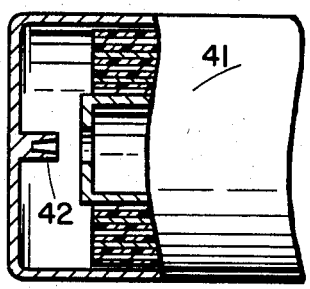
FIG. 6A is a sectional view showing how the assembly of FIG. 1 is received within an outer can and a second fastening means therefor.
Figure 6B:
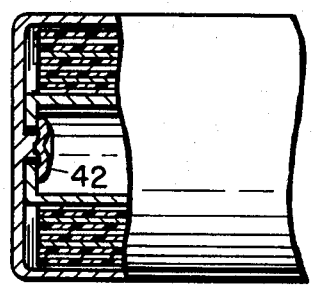
FIG. 6B is a sectional view of the embodiment of FIG. 6A showing the parts in final assembled relationship.

FIG. 6A shows another embodiment wherein the stub 42 is hollow to facilitate its deformation to a shape such as illustrated in FIG. 6B.

Figure 7A:
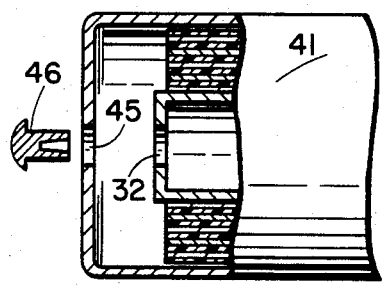
FIG. 7A is a sectional view showing how the assembly of FIG. 1 is received within an outer can and a third fastening means therefor.
Figure 7B:
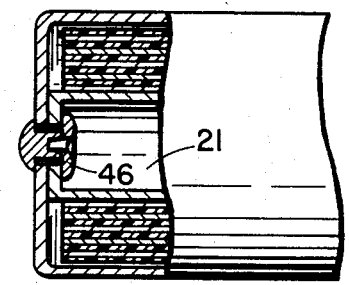
FIG. 7B is a sectional view of the embodiment of FIG. 7A showing the parts in final assembled relationship; and, FIG. 8 is a partially cut away drawing of a complete capacitor made in accordance with the capacitor construction of the present invention.

FIG. 7A shows an outer can 41 that does not have an integral stub, but instead has a hole 45 for receiving a separate rivet 46, which may be solid or hollow. In final assembled relationship, the rivet 46 is deformed to hold the inner and outer cans together as illustrated in FIG. 7B.

The inner and outer cans may also be fastened together by soldering or spot welding, thereby eliminating the need for the stub 42 or separate rivet 46. Spot welding works well with ferrous materials, such as galvanized sheet steel. With either spot welding or soldering it may be necessary to protect the capacitor roll from heat damage.

Figure 8:
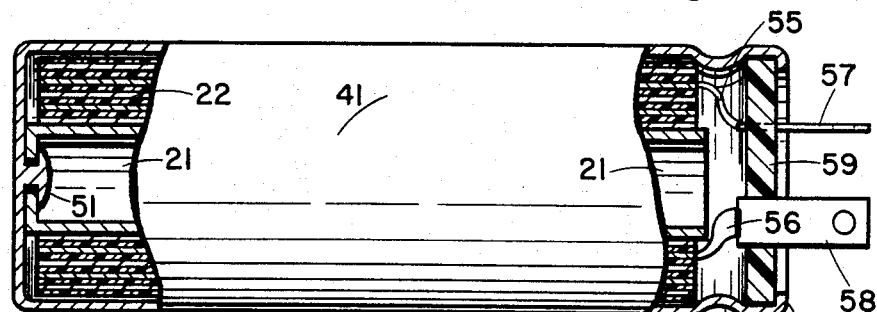

FIG. 8 shows a partially cut away view of a capacitor constructed in accordance with the present invention. The inner can 21 and capacitor roll 22 are received within the outer can 41, and the inner can 21 is fastened to the outer can 41 by fastening means 51, which may be any of the several fastening means shown herein, or an equivalent. The fastening means should provide both good thermal conductivity and mechanical support for the inner can and capacitor roll, thereby providing improved heat dissipation and, at the same time, eliminating the need for pitch or other potting compound.

Referring back to FIG. 1, there are shown two tab leads 55 and 56, one of which is electrically connected to the anode and the other to the cathode. These are cut to length and connected, e.g. by crimping or soldering, to a pair of solder lugs or terminals 57 and 58 mounted to an insulating closure member 59 shaped to fit within the open end of outer can 41. After the capacitor roll is inserted in the outer can 51 and the inner can 21 is fastened thereto by fastening means 51, leads 55 and 56 are connected to lugs 57 and 58, and member 59 is secured in place by crimping and rilling the open end of outer can 41 as shown at 60 in FIG. 8. Alternatively, the tab leads 55 and 56 may be made long enough so that they may be connected to tab leads 57 and 58 before the inner can 21 is fastened to the outer can 41. This allows a mandrel, punch, or spot welding electrode to be inserted through the inner can to complete the fastening of the inner can to the outer can before the open end of the outer can is closed. It is possible, of course, to complete the fastening by means of a blind rivet, threaded fastener, etc. after the open end of the outer can has been closed. However, it appears that the best heat conductive fastening at the most economical cost will be achieved by one of the embodiments illustrated herein.

While the invention has been described in considerable detail so as to enable it to be practiced, and a number of embodiments have been illustrated, other variations will be apparent to persons skilled in the art. Accordingly, the foregoing description should be considered as illustrative only and not limiting.

The invention claimed is:

1. A capacitor comprising:
   an inner can having an end portion;
   a capacitor roll wound upon said inner can;
   an outer can having a closed end;
   said inner can and said capacitor roll received within said outer can, the end portion of said inner can being adjacent the closed end of said outer can; and
   fastening means for fastening said inner can in good heat conducting relationship to said outer can.

2. The invention of claim 1 wherein said fastening means comprises a deformable stub integrally formed with the closed end of said outer can.

3. The invention of claim 2 wherein said stub is hollow.

4. A capacitor comprising:
   an inner can having an end portion;
   a capacitor roll wound upon said inner can
   an outer can having a closed end; and
   said inner can and said capacitor roll received within said outer can, the end portion of said inner can being adjacent the closed end of said outer can and fastened thereto in good heat conducting relationship.

* * * * *